(12) United States Patent
Taurasi, I (10) Patent No.: US 9,046,439 B2
(45) Date of Patent: Jun. 2, 2015

(54) E-LATCH HAVING A MAGNETIC SNAP ASSEMBLY

(71) Applicant: Magna Closures S.p.A., Leghorn (IT)

(72) Inventor: Marco Taurasi, I, Leghorn (IT)

(73) Assignee: MAGNA CLOSURES S.P.A., Leghorn (IT)

( * ) Notice: Subject to any disclaimer, the term of this patent is extended or adjusted under 35 U.S.C. 154(b) by 98 days.

(21) Appl. No.: 13/723,831

(22) Filed: Dec. 21, 2012

(65) Prior Publication Data

US 2013/0160538 A1  Jun. 27, 2013

Related U.S. Application Data

(60) Provisional application No. 61/579,778, filed on Dec. 23, 2011.

(51) Int. Cl.
| | |
|---|---|
| G08B 13/08 | (2006.01) |
| G01M 17/00 | (2006.01) |
| E05B 81/14 | (2014.01) |
| E05B 81/34 | (2014.01) |
| E05B 81/90 | (2014.01) |
| E05B 81/64 | (2014.01) |
| B23P 11/02 | (2006.01) |

(52) U.S. Cl.
CPC .......... *G01M 17/00* (2013.01); *Y10T 29/49876* (2015.01); *Y10T 29/49826* (2015.01); *B23P 11/02* (2013.01); *E05B 81/14* (2013.01); *E05B 81/34* (2013.01); *E05B 81/90* (2013.01); *E05B 81/64* (2013.01)

(58) Field of Classification Search
CPC ........ G01M 17/00; B23P 11/02; E05B 81/64; E05B 81/34; E05B 81/90; E05B 81/14; E05B 85/26; E05B 81/66; G01D 5/147; G01D 5/145
USPC ........ 340/547, 545.2, 545.1, 542, 540, 686.1; 73/117.01; 29/453, 428; 200/61.64; 292/216, 201
See application file for complete search history.

(56) References Cited

U.S. PATENT DOCUMENTS

| 4,249,161 A * | 2/1981 | Mohnhaupt .................... 340/457 |
| 2004/0195845 A1 * | 10/2004 | Chevalier ....................... 292/201 |
| 2007/0126577 A1 * | 6/2007 | Cervantes et al. ............. 340/547 |
| 2009/0266177 A1 * | 10/2009 | Hussain et al. .......... 73/861.357 |

* cited by examiner

*Primary Examiner* — Anh V La
(74) *Attorney, Agent, or Firm* — Dickinson Wright PLLC (57) ABSTRACT

A system for detecting the operative condition of a latch for a door of a motor-vehicle, comprises a magnetic field generating element adapted to generate a magnetic field which is associated to the operative condition of latch; a support which defines a housing for magnetic field generating element; and a sensor magnetically coupled with magnetic field generating element and adapted to sense the magnetic field. The generating element is snap-fitted to the housing.

20 Claims, 6 Drawing Sheets

E-LATCH HAVING A MAGNETIC SNAP ASSEMBLY

CROSS-REFERENCE TO RELATED APPLICATIONS

This application claims the benefit of U.S. Provisional Application No. 61/579,778 filed on Dec. 23, 2011. The entire disclosure of the above application is incorporated herein by reference.

FIELD

The present disclosure relates to a system for detecting the operative condition of a latch for a door of a motor vehicle. The present disclosure also relates to a method for assembling a system for detecting the operative condition of a latch for a door of a motor vehicle.

BACKGROUND

This section provides background information related to the present disclosure which is not necessarily prior art.

The term "door" is used broadly speaking to indicate any partition movable between an open position and a closed position respectively opening and closing an access opening to an inner compartment of a vehicle, and therefore also includes boot and bonnet lids, rear hatches, sun-roofs, and convertible roofs, in addition to the side doors of vehicles referred to in the description purely by way of example.

As is known, the vehicle doors normally comprise a frame-like top portion defining a window frame closed by a movable window when this is raised; and a box-like bottom portion comprising an outer panel and an inner panel joined at one end by an end edge and defining in between a cavity normally housing the window, when this is lowered, and various component parts fixed to the panels, such as a lock and a window regulating device.

As is also known, a latch is associated with the vehicle door and can include a supporting body fixed to the vehicle door, a closure assembly carried by the supporting body and adapted to releasably engage a striker integral with a fixed doorpost, and a release and lock assembly which can be activated selectively to release the closure assembly from the striker or to lock the closure assembly in a condition of engagement with the striker.

Very briefly, the latch can be set at least into a closed operative condition in which the closure assembly engages the striker and in a second open operative condition in which the striker is released from the closure assembly.

Known latches may also include a system for detecting the operative conditions of the latch. Such detection systems include a magnet fixed to a support element of the closure assembly and which assumes a different position on the basis of the respective operative condition of the latch, a printed circuit board mounted on the supporting body of the latch and nearby to the support element, and a Hall effect sensor mounted on the printed circuit board.

Very briefly, the sensor outputs an electrical signal which varies with the magnetic field detected by the same sensor and, therefore, with the position of the magnet and the operative condition of the latch.

For example, the aforesaid support element could be a gear wheel of a gear-train, which is part of the release and lock assembly and is functionally interposed between the electric motor and the closure assembly.

According to a first known solution, the magnet is fixed by using glue or resin to the plastic part of the rotatable element. However, that first known solution requires a long time for allowing the glue or the resin to dry, thus increasing the time necessary for assembling the latch.

According to a second known solution, the magnet is over-molded inside the plastic rotatable element. However, the second known solution requires to carry out a magnetization step after the magnet has been over-molded. Accordingly, also the second known solution increases the time necessary for assembling the latch.

A need is felt within the industry to obtain a system for detecting the operative condition of the latch which is particularly fast and cheap to assembly.

SUMMARY

This section provides a general summary of the disclosure, and is not a comprehensive disclosure of its full scope or all of its features.

It is therefore desirable for certain aspects of the present disclosure to provide a system for detecting the operative condition of a latch, designed to meet the aforementioned need.

For example a system for detecting the operative condition of a latch for a door of a motor-vehicle may comprise:

a magnetic field generating element adapted to generate a magnetic field which is associated to the operative condition of the latch;

a support which defines a housing for the magnetic field generating element; and a sensor magnetically coupled with the magnetic field generating element and adapted to sense the magnetic field, wherein the generating element is snap-fitted to the housing.

In a further embodiment, the housing defines a cavity which extends about an axis. The housing comprises at least one retaining element which extends into cavity, is elastically deformable when the generating element is inserted inside the cavity and elastically returns to snap-lock the generating element inside the cavity. The cavity is bounded by an inner surface with respect to the axis; the inner surface is elastically deformable for allowing the insertion of the generating element; the cavity comprises an insertion stretch adapted to allow the insertion of the generating element and inside which the retaining element is arranged; and a seat inside which the generating element is snap-locked by the retaining element.

In a further aspect, the retaining element is tapered proceeding according an insertion direction of the generating element inside the cavity.

In yet a further aspect, the housing comprises:

a tubular housing wall which extends about the axis which bounds a first open end of the seat; and an end wall transverse to the axis and which closes the seat on the opposite side of the open end of the seat.

In another embodiment, the housing defines at least one through passage for allowing the air contained into the seat to escape during the insertion of the generating element. The passage is defined by either the housing wall, or the end wall, or both the housing wall and the end wall.

In another embodiment, the housing wall is bounded by an outer surface on the opposite side of the seat. The outer surface comprises at least one relief adapted to allow the deformation of the end wall during the insertion of the generating element. The relief may extend parallel to the axis of the seat.

In another embodiment, at least part of the relief defines the passage.

In another embodiment, the support may assume different operative positions associated to respective operative conditions of the latch.

Furthermore, the generating element may be a permanent magnet and the magnetic field sensor may comprise a printed circuit board: Alternatively, the generating element may be a permanent magnet and the magnetic field sensor may comprise a printed circuit board.

In yet another embodiment the sensor is a Hall sensor.

The present disclosure also relates to a latch for a door of a motor-vehicle, comprising:

a system comprising: a magnetic field generating element adapted to generate a magnetic field which is associated to the operative condition of the latch, a support which defines a housing for the magnetic field generating element, and a sensor magnetically coupled with the magnetic field generating element and adapted to sense the magnetic field, wherein the generating element is snap-fitted to the housing;

a supporting body to which is fitted one of the generating element or magnetic field sensor; and a closure assembly comprising a movable element to which is fitted the other one of the generating element or magnetic field sensor.

The present disclosure in certain aspects also relates to a method for assembling a system for detecting the operative condition of a latch for a door of a motor vehicle, the system comprising:

a magnetic field generating element adapted to generate a magnetic field which is associated to the operative condition of the latch;

a support which defines a housing for the magnetic field generating element; and a sensor magnetically coupled with the magnetic field generating element and adapted to sense the magnetic field, characterized by snap-fitting the generating element to the housing.

In an embodiment, the method comprises the steps of:

inserting the generating element inside an insertion stretch of a cavity defined by the housing;

elastically spacing apart from an axis of the cavity at least one retaining element, when the generating element is inserted inside the insertion stretch; and snap-locking the generating element inside a seat of the cavity, when the retaining element elastically returns in a substantially un-deformed condition.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

A preferred, non-limiting embodiment of aspects of the present invention will be described by way of example with reference to the accompanying drawings, in which.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Number 100 in FIGS. 2 to 7 indicates as a whole a system for detecting the operative condition of a latch 1 (FIGS. 1 to 3) for a door of a motor-vehicle.

System 100 is, in the embodiment shown, part of latch 1. System 100 substantially comprises: a support element which assumes different positions associated to respective operative conditions of latch 1; a magnetic field generating element, a permanent magnet 102 in the embodiment shown, fitted to support element; and a magnetic field sensor 103 adapted to sense the magnetic field generated by magnet 102 and to accordingly detect the position of the support element and therefore the operative condition of latch 1. As it will be clear in the following of the present description, support element may be a gear wheel 52 which is part of latch 1.

Sensor 103 comprises, in the embodiment shown, (FIGS. 6 and 7) a printed circuit board 104 arranged nearby permanent magnet 102. Sensor 103 is, in the embodiment shown, a Hall effect sensor mounted on printed circuit board 104.

Very briefly, sensor 103 outputs an electrical signal which varies with the intensity of magnetic field detected by sensor 103 itself and is, therefore, associated to the position of gear wheel 52 and to the operative condition of latch 1.

Magnet 102 is, in the embodiment shown, cylindrical. Magnet 102 is advantageously snap-fitted to gear wheel 52. Gear wheel 52 substantially comprises: a discus 58 mounted for rotation about an axis A and having a main extension on a plane orthogonal to axis A; and a housing 111 protruding from discus 58 along an axis B parallel to axis A.

In the embodiment shown, axis B is staggered from axis A.

Figure 6:
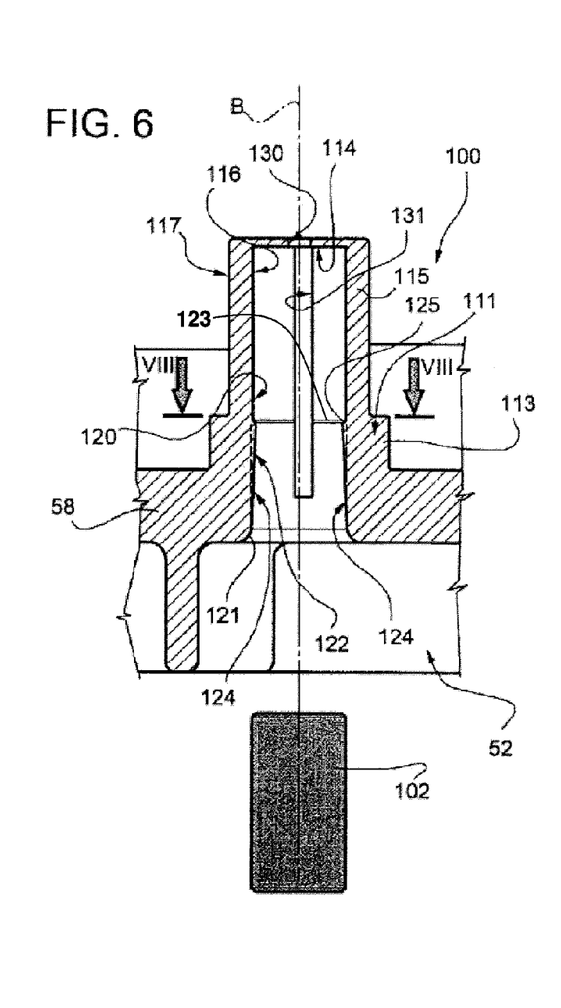
FIGS. 6 and 7 are frontal enlarged views showing the assembly of the system of FIGS. 1 to 3.
Figure 7:
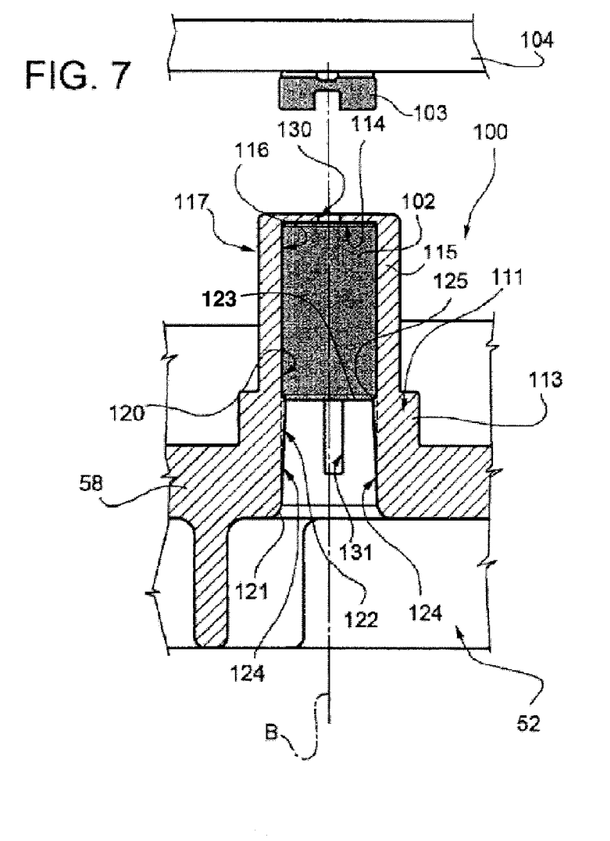
Figure 8:
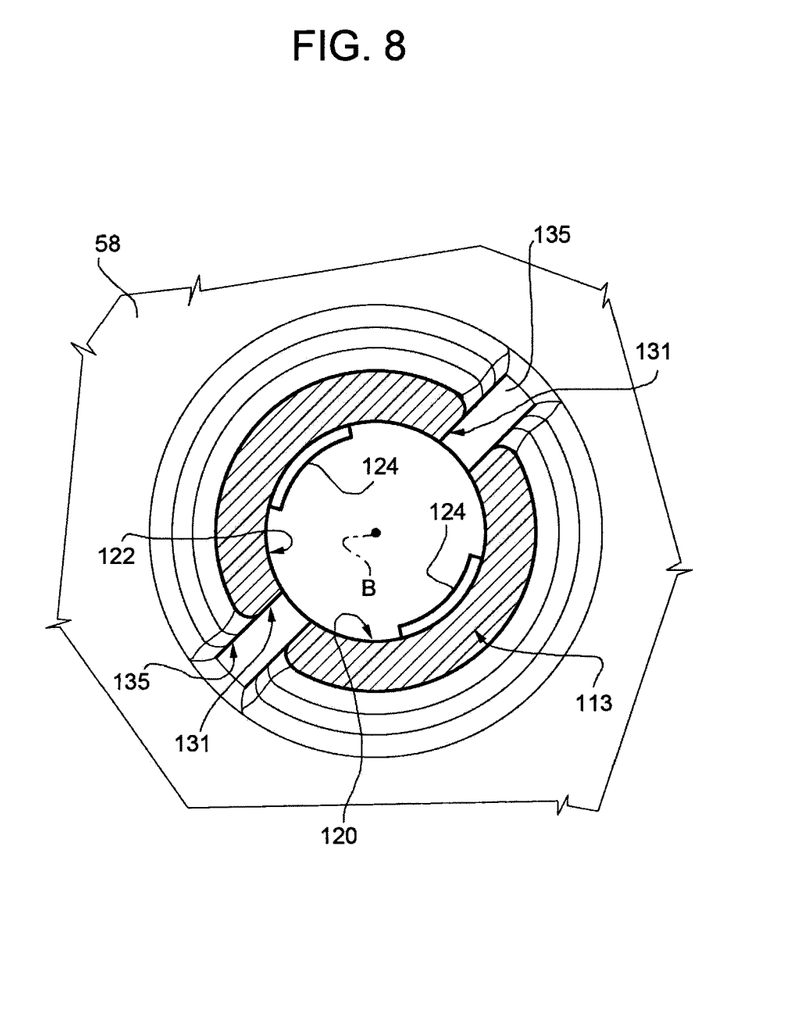
FIG. 8 is a section taken along line VIII-VIII of FIG. 6.

Housing 111 substantially comprises (FIG. 6), proceeding from discus 58 towards the opposite side of that discus 58, a housing wall originating from the discus 58 and extending to an end wall 114 opposite the discus 58. In the embodiment of FIGS. 6 and 7, the housing wall includes a root wall 113 originating from the discus 58; and a middle wall 115 interposed between the root wall 113 and the end wall 114. The end wall 114 is orthogonal to axis B. Housing 111 also comprises an inner tubular surface 116 arranged on side of axis B, and an outer tubular surface 117 opposite to surface 116 and arranged on the opposite side of axis B.

Surface 116 defines a cavity 120. Cavity 120 has an open axial open end 121 on the side of discus 58 and is bounded by wall 114 on the opposite axial side of discus 58.

Cavity 120 comprises, in turn, proceeding from end 121 towards wall 114, an insertion stretch 122 through which magnet 102 is inserted by exerting an action along axis B and directed towards wall 115; and a seat 123 inside which magnet 102 is snap-fitted (FIGS. 6 and 7).

Stretch 122 extends from end 121 to an end 125, opposite to end 121 and axially interposed between end 121 and wall 114. Stretch 122 comprises: a main cylindrical portion; and a plurality of retaining sectors 124 radially protruding from surface 116 towards axis B and adapted to snap-lock magnet 102 inserted inside seat 123 (FIG. 7).

In detail, sectors 124 taper from end 121 towards seat 123 and are, in the embodiment shown, conical. Sectors 124 are normally disposed in a rest un-deformed position in which they define a passage for magnet 102 having a diameter lower than the diameter of magnet 102.

When magnet 102 enters stretch 122, sectors 124 are elastically deformed by magnet 102 to assume an elastical spaced apart position in which they allow the passage of magnet 102. In the embodiment shown, retaining sectors 124 are angularly equi-spaced about axis B and are in the number of two.

Once magnet 102 is housed inside seat 123, sectors 124 elastically return to the rest position, so as to snap-locking magnet 102 inside seat 123. Seat 123 is cylindrical. The diameter of seat 123 is smaller than the diameter of magnet 102.

Housing 111 also defines a plurality of through openings 130, 131 adapted to allow the air to escape from seat 123 during the insertion of magnet 102. In detail, opening 130 is defined by wall 114. Opening 130 is, in the embodiment shown, a circular through hole coaxial with axis B. Openings 131 are defined by surface 117 and extend substantially parallel to axis B. Openings 131 extend from wall 114 up to substantially a half of stretch 122. Openings 131 are angularly equi-spaced and are, in the embodiment shown, in the number of two.

Surface 117 defines a plurality of reliefs 135 which reduce the thickness of housing 111, thus allowing magnet 102 to be inserted inside stretch 122 and snap-fitted inside seat 123. Reliefs 135 circumferentially and radially surround respective openings 131 and extend parallel to axis B for a length greater than opening 131. The reliefs 135 can be adapted to allow deformation of the end wall 144 during the insertion of the magnet 102. In the embodiment shown, reliefs 135 are angularly equi-spaced about axis B and in the number of two. Furthermore, reliefs 135 extend from wall 114 to root wall 113. Reliefs 135 and retaining sectors 124 are alternate about axis B.

Gear wheel 52 is, in the embodiment show, made by a plastic material.

System 100 is assembled by inserting magnet 102 inside stretch 122 of cavity 120 along axis B and through end 121. The insertion of magnet 102 elastically spaces apart sectors 124 relative to axis B and towards a deformed position, thus allowing magnet 102 to enter seat 123. The elastic return of sectors 124 towards axis B and into the un-deformed position snap-locks magnet 102 inside seat 123. The air contained inside seat 123 escapes through openings 130, 131, when magnet 102 enters seat 123.

Figure 1:
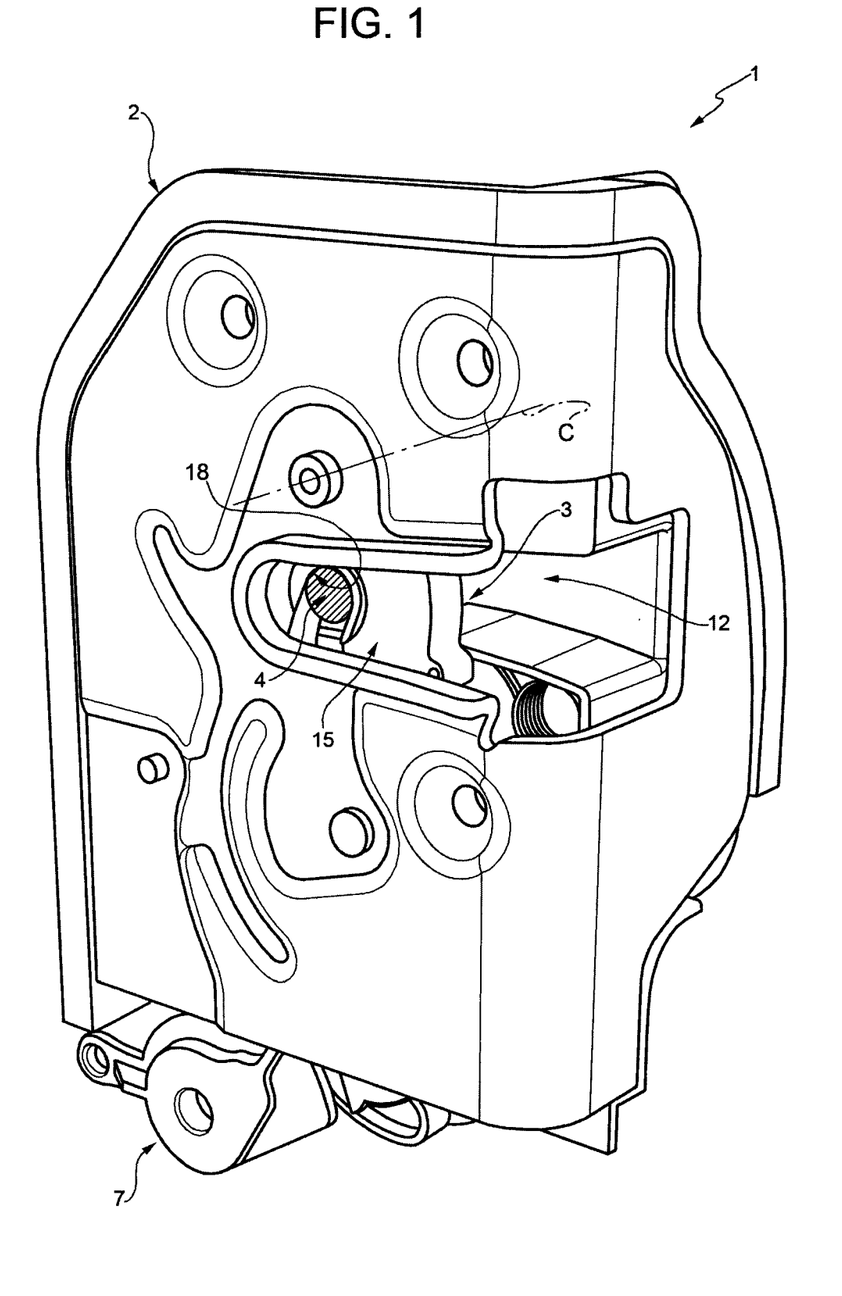
FIGS. 1 to 3 are frontal perspective views with parts removed for clarity of a latch set in different operative positions and of a system for detecting the condition of the latch in accordance with an exemplary embodiment of the present disclosure.
Figure 2:
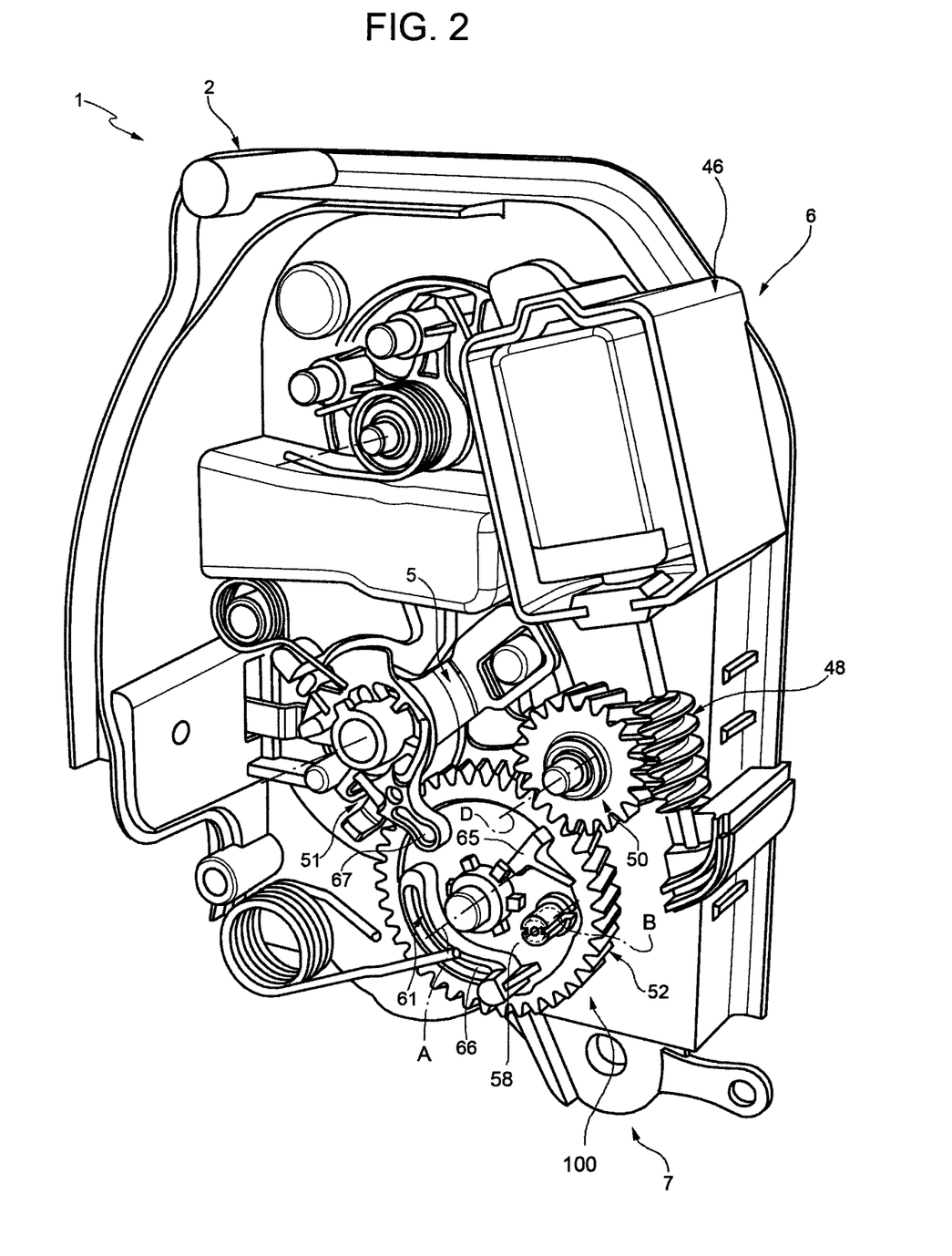
Figure 3:
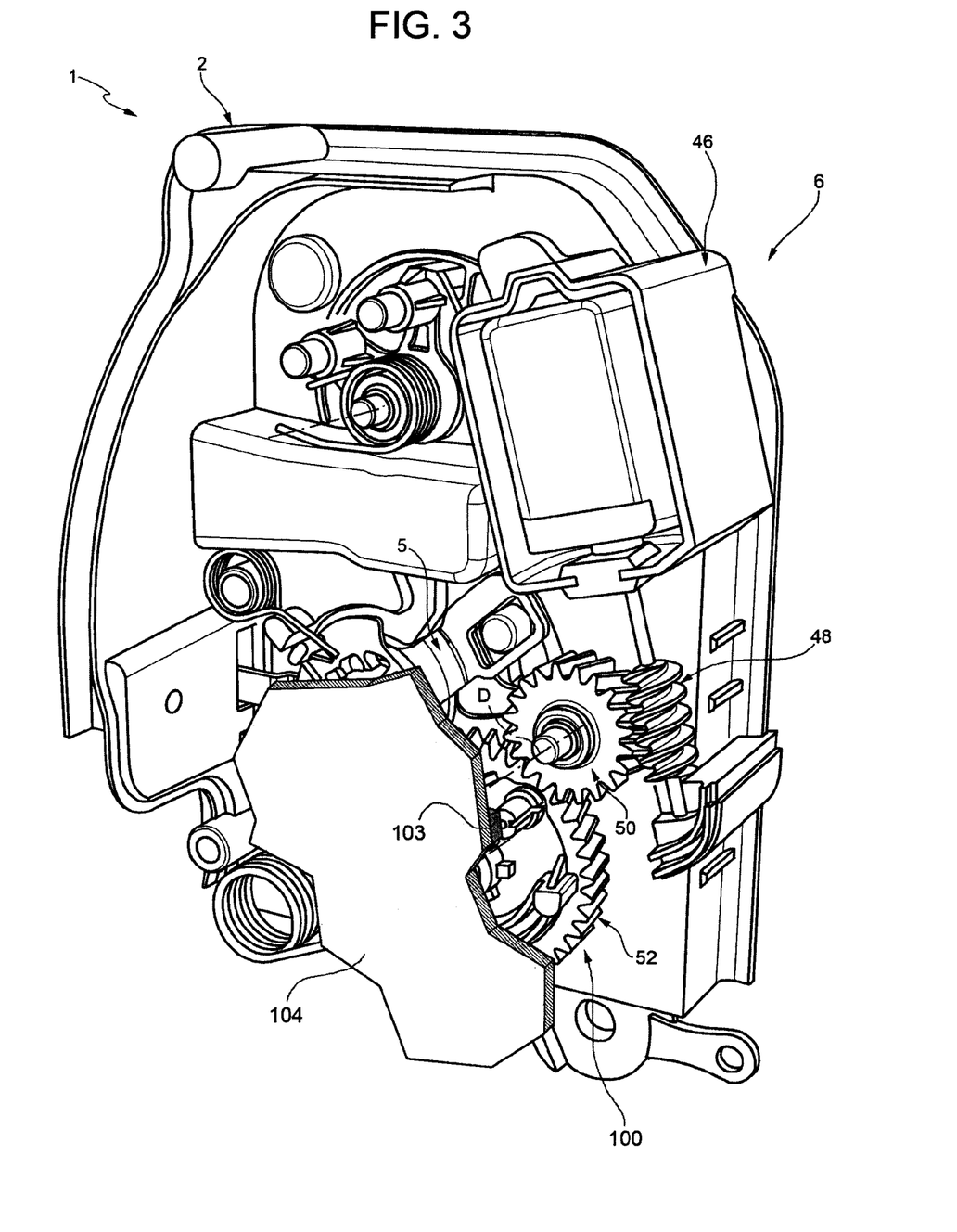
Figure 4:
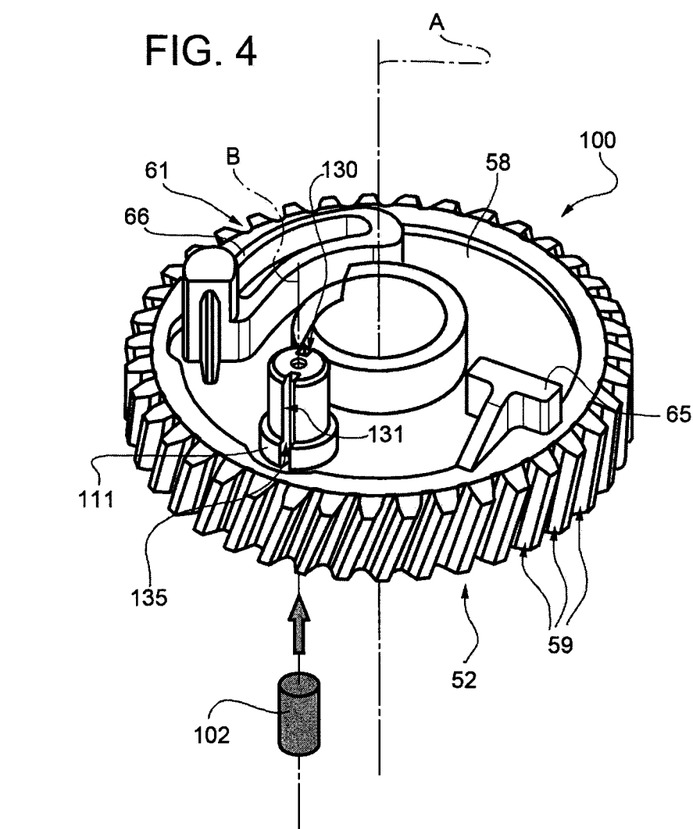
FIGS. 4 and 5 are perspective enlarged views showing the assembly of the system of FIGS. 1 to 3.
Figure 5:
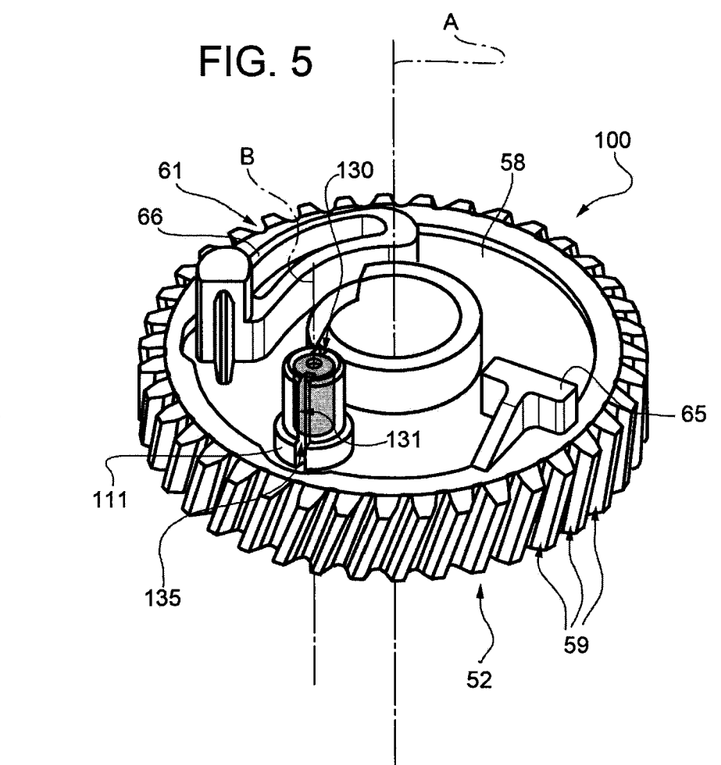

With reference to FIGS. 1 to 3, gear wheel 52 is incorporated, in the embodiment shown into an electrically operated release and lock assembly 6 of latch 1. Gear wheel 52 could be incorporated in any kind of latch, either mechanically or electrically operated. Accordingly, latch 1 is described in the present description as an example only insofar as necessary to the understanding of certain aspects of the present invention.

Latch 1 is of the type described in the European application no 12164511.3, the content of which is incorporated by reference in the present application.

Latch 1 substantially comprises (FIGS. 1 to 3): a supporting body 2 fixed to the vehicle door and carrying sensor 103 and printed circuit board 104; a closure assembly 3 carried by supporting body 2 and adapted to releasably engaging a striker 4 (only partially shown in FIG. 1) integral with a fixed doorpost (not shown); an electrically-operated release and lock assembly 6 which can be activated selectively to release closure assembly 3 from striker 4 or to lock closure assembly 6 in a condition of engagement with the striker 4; an inside emergency release lever 5 which can be manually operated by the user from the inside of the vehicle to release latch 1 in case of failure of the release and lock assembly 6; and a back-up mechanism 7 which can be manually operated by the user from the outside of the vehicle to release or to lock latch 1 in case of failure of the release and lock assembly 6.

Supporting body 2 defines a C-shaped lateral opening 12 which is adapted to receive striker 4 when closing the door.

With reference to FIGS. 1 and 2, closure assembly 3 basically comprises a ratchet 15 superimposed on the opening 12 for receiving striker 4, and a not-shown releasable locking mechanism cooperating with ratchet 15 to prevent disengagement between the striker 4 and ratchet 15. Ratchet 15 is hinged about an axis C parallel to axis A, B, defines a C-shaped peripheral seat 18 bounded laterally by two teeth and adapted to receive striker 4, and comprises a first and second shoulder. Furthermore, ratchet 15 is pushed by a not-shown spring into a release position, in which seat 18 faces opening 12 in the supporting body 2, and so permits the engagement and release of striker 4.

When the door is slammed, ratchet 15 is rotated by striker 4 about axis C to lock or click onto lock assembly 6 in two different positions: a partially locked or first-click position (not shown), and a fully locked or second-click position (FIGS. 1, 2).

Very briefly, the locking mechanism comprises: a primary pawl movable between a ratchet checking position, wherein the primary pawl is positioned to keep ratchet 15 in the partially locked position or in the fully locked position, and a ratchet release position wherein the primary pawl permits the movement of ratchet 15 out of the lock position; an auxiliary ratchet operatively connected to primary pawl and movable between an enabling position in which the primary pawl is enabled to move to its ratchet checking position, and a disabling position in which the auxiliary ratchet positions the primary pawl to its ratchet release position; and a secondary pawl movable between an auxiliary ratchet holding position, in which the secondary pawl is positioned to hold auxiliary ratchet in its enabling position, and an auxiliary ratchet release position, in which the secondary pawl is positioned to permit movement of the auxiliary ratchet to its disabling position.

With reference to FIG. 3, release and lock assembly 6 basically comprises an electric motor 46, a worm gear 48 driven in rotation by motor 46, a first gear wheel 50 meshing with worm gear 48, an actuating lever 51 adapted to interact in a not shown way with the auxiliary ratchet, and gear wheel 52 meshing with gear wheel 50 and adapted to interact with secondary pawl and with actuating lever 51. Gear wheel 50 is mounted for rotation about axis D. Gear wheel 52 is functionally interposed between gear wheel 50 and actuating lever 51: this means that gear wheel 52 is driven by gear wheel 50 and drives actuating lever 51.

As clearly shown in FIG. 3, gear wheel 52 comprises discus 58, a plurality of teeth 59 extending along the periphery of the discus 58 and meshing with corresponding teeth of gear wheel 50, and first not-shown cam means and second cam means 61 provided on the opposite faces of discus 58 for interacting with the secondary pawl and actuating lever 51, respectively.

In actual use, starting from the closed condition of FIGS. 1 and 2, latch 1 is released by activating electric motor 46 so as to obtain anticlockwise rotation of gear wheel 52 about axis A (visible by comparing FIGS. 2 and 3). During a first part of this rotation, a push block 65 of cam means 61 moves towards an arm 67 of actuating lever 51 and the second cam means move in a not-shown way the secondary pawl into the auxiliary ratchet release position (FIGS. 2 and 4 to 7).

The auxiliary ratchet is therefore free to rotate towards its disabling position.

Therefore, the result of the movements imparted by the activation of electric motor 46 and of rotation of gear wheel 52 is a rotation of auxiliary ratchet into the disabling position. This rotation produces a corresponding rotation of primary pawl so as to free ratchet 15, which can rotate into the release position under the thrust of the not-shown spring. In this condition, disengagement between ratchet 15 and striker 4 is made possible.

Immediately after the opening of latch 1, electric motor 46 is again activated in the opposite direction so as to produce a clockwise rotation of gear wheel 52 with a consequent interaction of push block 66 of second cam means 61 with arm 67 of actuating lever 51 In this way, actuating lever 51 moves the auxiliary ratchet into the enabling position. During this rotation, the secondary pawl moves to the auxiliary ratchet holding position, in which it retains the auxiliary ratchet its enabling position.

When the door is slammed an impact of striker 4 is produced on the other tooth of ratchet 15 with a consequent clockwise rotation of ratchet 15 about axis A in opposition to the not-shown spring. As the first shoulder of ratchet 15 is pushed past primary pawl, the latter clicks further towards ratchet 15 with its free end positioned in front of the shoulder 22; ratchet 15 is thus prevented from being sprung back by the not-shown spring into the release position by the first shoulder resting against the free end of the primary pawl, and so remains locked in the fully locked position, in which one tooth closes off opening 12 of supporting body 2 to prevent withdrawal of striker 4 from opening 12 (FIGS. 1 and 2).

It is evident by comparison of FIGS. 1 and 2 with FIG. 3 and from the above that the operative conditions of latch 1, e.g. the fact that latch 1 is set in the opening position or in the closing position, is associated to the angular position of gear wheel 52. Conversely, sensor 103 remains stationary relative to supporting body 2. The rotation of gear wheel 52 causes the rotation of magnet 102 which varies the magnetic field sensed by sensor 103. In this way, sensor 103 can detect the operative condition of latch 1.

The advantages of system 100 and of certain aspects of the methods according to the present invention will be clear from the foregoing description.

In particular, magnet 102 is snap-fitted to housing 111. In this way, magnet 102 can be inserted inside seat 123 with a relatively low effort and automatically just after the production of gear wheel 52. As a result, the assembling of system 100 requires relatively short times, contrary to the known solution discussed in the introductory part of the present description.

Sectors 124 elastically move apart from each other, when magnet 102 is inserted inside seat 123 and then elastically return into a rest position in which they snap-lock magnet 102 inside that seat 123. In this way, sectors 124 are effective in retaining magnet 102 in seat 123.

Openings 130, 131 allow the air contained inside seat 123 to escape, when magnet 102 enters that seat 123.

Reliefs 135 reduce the stiffness of housing 111, thus allowing the latter to elastically deform when magnet 102 enters stretch 122 and seat 123.

Clearly, changes may be made to system 100 as described and illustrated herein without, however, departing from the scope defined in the accompanying claims.

In particular, system 100 may be incorporated into a different kind of latch, for example a traditional purely mechanical latch. Support element may be formed by a member of latch 1 different from gear wheel 52. Magnet 102 may be fitted to supporting body and printed circuit board 104 could be fitted to support 102. Furthermore, sensor 103 may be a magnetic field sensor using a physical principle different from Hall effect.

Also, striker 4 may be fixed to the vehicle door, and supporting body 2, together with latch 1, may be fixed to the doorpost.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for detecting the operative condition of a latch for a door of a motor-vehicle, the system comprising:
   a gear wheel which defines a housing;
   a magnetic field generating element disposed in said housing and adapted to generate a magnetic field which is associated to the operative condition of said latch; and
   a sensor magnetically coupled with said magnetic field generating element and adapted to sense said magnetic field, wherein said generating element is snap-fitted to said housing.

2. The system of claim 1, wherein said housing defines a cavity which extends about an axis (B), and wherein said housing comprising at least one retaining element which extends into said cavity, said retaining element is elastically deformable when said generating element is inserted inside said cavity and elastically returns to snap-lock said generating element inside said cavity.

3. The system of claim 2, wherein said cavity is bounded by an inner surface with respect to said axis (B), said inner surface being elastically deformable for allowing the insertion of said generating element, and wherein said cavity includes an insertion stretch adapted to allow the insertion of said generating element and inside which said retaining element is arranged, and a seat inside which said generating element is snap-locked by said retaining element.

4. The system of claim 2, wherein said retaining element is tapered proceeding according to an insertion direction of said generating element inside said cavity.

5. The system according to claim 1 wherein said housing comprises a tubular housing wall which extends about an axis (B) which bounds a first open end of a seat, and an end wall transverse to said axis (B) and which closes said seat on the opposite side of said open end of said seat.

6. The system of claim 5, wherein said housing defines at least one through passage for allowing the air contained into said seat to escape during the insertion of said generating element, and wherein said passage is defined by either said housing wall or said end wall or both said housing wall and said end wall.

7. The system of claim 6, wherein said housing wall is bounded by an outer surface on the opposite side of said seat, and wherein said outer surface comprises at least one relief adapted to allow the deformation of said end wall during the insertion of said generating element.

8. The system of claim 7, wherein said relief extends parallel to said axis (B) of said seat.

9. The system claim 7, wherein at least part of said relief defines said passage.

10. The system of claim 1, wherein said gear wheel assumes different operative positions associated with respective operative conditions of said latch.

11. The system of claim 1, wherein either said generating element is a permanent magnet and said magnetic field sensor comprises a printed circuit board, or wherein said generating element is a permanent magnet and said magnetic field sensor comprises a printed circuit board.

12. The system of claim 1, characterized in that said sensor is a Hall sensor.

13. A latch for a door of a motor-vehicle, the latch comprising: said system according to claim 1;
a supporting body carrying said magnetic field sensor; and
a release and lock assembly comprising said gear wheel.

14. The system of claim 1, wherein said gear wheel includes a discus extending along a plane orthogonal to an axis and rotatable about said axis, said housing of said gear wheel includes a housing wall extending from a first side of said discus and parallel to said axis, said housing wall defines a cavity for receiving said magnetic field generating element, and a second side of said discus defines an opening to said cavity.

15. The system of claim 14, wherein said housing includes an end wall closing said cavity at an end opposite said opening of said discus.

16. The system of claim 15, wherein said housing includes a plurality of reliefs each having a reduced thickness relative to remaining portions of said housing, and said reliefs extend from said discus to said end wall.

17. A method for assembling a system for detecting the operative condition of a latch for a door of a motor vehicle; said system comprising:
a gear wheel which defines a housing;
a magnetic field generating element disposed in said housing and adapted to generate a magnetic field which is associated to the operative condition of said latch; and
a sensor magnetically coupled with said magnetic field generating element and adapted to sense said magnetic field, wherein said generating element is snap-fitted to said housing.

18. The method of claim 17, comprising the steps of:
inserting said generating element inside an insertion stretch of a cavity defined by said housing;
elastically spacing apart from an axis (B) of said cavity at least one retaining element, when said generating element is inserted inside said insertion stretch; and
snap-locking said generating element inside a seat of said cavity upon said retaining element elastically returning to a substantially un-deformed condition.

19. The method of claim 17, wherein said gear wheel includes a discus extending along a plane orthogonal to an axis and rotatable about said axis, said housing of said gear wheel includes a housing wall extending from a first side of said discus and parallel to said axis, said housing wall defines a cavity for receiving said magnetic field generating element, and a second side of said discus defines an opening to said cavity.

20. The method of claim 19, wherein said housing includes an end wall closing said cavity at an end opposite said opening of said discus.

* * * * *